United States Patent Office 3,322,651
Patented May 30, 1967

3,322,651
PURIFICATION OF PHENOL
Earl A. Nielsen, Lombard, Ill., assignor to Universal Oil Products Company, Des Plaines, Ill., a corporation of Delaware
No Drawing. Filed Mar. 12, 1964, Ser. No. 352,426
10 Claims. (Cl. 203—38)

This invention relates to a novel process for the purification of phenol prepared by decomposition of cumene hydroperoxide.

Phenol is prepared by the partial oxidation of cumene and subsequent decomposition of the resulting cumene hydroperoxide. The decomposition reaction mixture comprises phenol, acetone, and unreacted cumene. The phenol, recovered from the cumene hydroperoxide decomposition reaction mixture by distillation methods, contains acetone condensation products, principally mesityl oxide, as well as other carbonyl compounds. Although present in only minute quantities, the carbonyl compounds have color-forming tendencies which render the phenol product commercially unacceptable in many instances.

It is therefore an object of this invention to present a novel process for the purification of phenol containing carbonyl compounds as impurities therein.

In one of its broad aspects, this invention embodies a process which comprises contacting the carbonyl compound contaminated phenol with a nitrogen compound hereinafter described, forming reaction products of the said carbonyl compounds and the said nitrogen compounds and thereafter separating phenol from the said reaction products, the aforesaid nitrogen compound being represented by the formula

wherein $R_1$ and $R_2$ are selected from the group consisting of hydrogen, alkyl, cycloalkyl, aryl, alkaryl, aralkyl, hydroxyalkyl and polymethylene radicals, said polymethylene radicals together forming a heterocyclic ring in combination with the nitrogen atom to which they are attached.

Other objects and embodiments of this invention will become apparent in the following detailed specification.

In accordance with the process of this invention, the carbonyl compound-containing phenol is contacted with a nitrogen compound of the formula:

$R_1$ and $R_2$ can be polymethylene radicals which in combination, and together with the nitrogen atom through which they are attached, form a heterocyclic ring. Also, $R_1$ and $R_2$ may be independently selected from the group consisting of hydrogen, alkyl, cycloalkyl, aryl, alkaryl, aralkyl and hydroxyalkyl.

Thus it will be seen that the nitrogen compound can be ammonia, and one of the more specific embodiments of this invention relates to a process for the purification of phenol containing carbonyl compounds as impurities, which process comprises contacting the phenol with ammonia, forming reaction products of the said carbonyl compounds and ammonia, and separating phenol from the said reaction products.

Nitrogen compounds with which the phenol can be contacted pursuant to the process of this invention further include alkyl primary amines like methylamine, ethylamine, propylamine, isopropylamine, n-butylamine, sec-butylamine, beta-ethylbutylamine, amylamine, isoamylamine, alpha-methylamylamine, n-hexylamine, isohexylamine, n-heptylamine, heptadecylamine, etc., and also dialkyl secondary amines, for example, dimethylamine, diethylamine, ethylmethylamine, diisopropylamine, di-n-butylamine, di-sec-butylamine, bis(beta-ethylbutyl)amine, morpholine, and the like. One of the embodiments of this invention relates to a process for the purification of phenol containing carbonyl compound as impurities, which process comprises contacting the phenol with an alkyl primary amine, preferably methylamine, and forming reaction products of the said carbonyl compounds and the said amine and thereafter separating phenol from the said reaction products. In another embodiment, a dialkyl secondary amine, preferably diethylamine, is utilized.

Still another embodiment of this invention concerns a process for the purification of phenol containing carbonyl compounds as impurities wherein the nitrogen compound is an alkanolamine, preferably ethanolamine. Other suitable alkanolamines include 3-hydroxy-n-propylamine, 2-hydroxy-n-propylamine, 4-hydroxy-n-butylamine, 3-hydroxy-n-butylamine, and the like, and also dialkanol amines such as diethanolamine, etc.

In still another embodiment, the nitrogen compound is benzylamine. Other such aralkyl amines like beta-phenylethylamine, alpha-phenylethylamine, beta-phenylpropylamine, etc., and also diaralkylamines like di-beta-phenylethylamine and the like, are also operable.

Other nitrogen compounds of the described formula

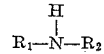

which can be utilized include cycloalkyl amines like cyclopentylamine, cyclohexylamine, etc., and also dicycloalkylamines such as dicyclopentylamine, dicyclohexylamine, and the like. Arylamines like aniline, 1-naphthylamine, 2-naphthylamine, N-methylaniline, N-ethylaniline, etc., as well as diarylamines including diphenylamine, di-2-naphthylamine and the like, and also alkarylamines, for example, toluidine, xylidine, o-ethylaniline, etc., are also operable. Piperidine, pyrrolidine, and other like compounds of the formula

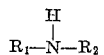

wherein $R_1$ and $R_2$ are polymethylene radicals which, together with the nitrogen atoms to which they are attached, form a heterocyclic ring, can also be utilized.

The required amount of any particular nitrogen compound herein described is dependent on the concentration of the carbonyl compound impurities in the phenol product to be treated. In the usual case, from about .02% to about 0.2%, based on the weight of the phenol to be treated, is adequate although larger amounts can be utilized. The optimum amount in any particular case is in part dependent on the nitrogen compound being utilized and in part on the concentration of carbonyl compounds, the latter being readily determined by routine experimentation. The reaction products of the nitrogen compound and the carbonyl compounds, as well as any excess nitrogen compound utilized, can be separated from the phenol by acid extraction methods, distillation methods, or other suitable means. When the phenol is recovered by distillation methods, any excess of ammonia or other nitrogen compound may distill over with the phenol. This can be obviated by including only the required amount of nitrogen compound in the phenol, which amount may be readily determined by experiment. Alternatively, the excess nitrogen compound as well as the reaction products of the nitrogen compound and carbonyl compounds can be retained in the distillation bottoms by treatment with an equivalent amount of an acid, for example sulfuric acid. However, since the addition of any excess acid tends to decompose the nitrogen compound-carbonyl compound reaction products, it is preferred to avoid the use of an acid altogether and to utilize instead a higher boiling nitrogen compound, for example diethanolamine (B.P. 270° C.), to achieve the same effect.

The phenol is preferably contacted with the nitrogen compound at liquid phase reaction conditions. While this can be accomplished at normal room temperature of about 25° C., for example in the case where phenol and ammonia are contacted in aqueous solution, it may be desirable to utilize an elevated temperature within the melting and the boiling point range of phenol, i.e. from about 41° C. to about 182° C. Although the temperature is not a critical aspect of this invention, reaction rates are accelerated at higher temperatures and the necessary contact time between phenol and the nitrogen compound is thereby minimized.

The following examples are presented in illustration of the process of this invention and are not intended as an undue limitation on the generally broad scope thereof.

*Example I*

104 grams of phenol prepared by decomposition of cumene hydroperoxide was analyzed by gas-liquid chromatography methods and found to contain 0.16 wt. percent mesityl oxide and 0.17 wt. percent of a carbonyl compound described as an acetone trimer, as well as 0.02 wt. percent of unknown impurity. The phenol was therefore 99.65% pure. About 5 grams of ammonia in dilute aqueous solution was added to the phenol and the resulting solution was thoroughly mixed at room temperature. Thereafter, phenol was separated from the ammonia and the impurity products by distillation. Gas-liquid chromatography analysis of the recovered phenol indicated a product purity of 99.91%. There was no evidence of "acetone trimer" and mesityl oxide had been reduced to about 0.02 wt. percent.

*Example II*

150 grams of a phenol sample prepared by decomposition of cumene hydroperoxide was analyzed by gas-liquid chromatography methods and found to contain 0.11 wt. percent acetone, 0.13 wt. percent mesityl oxide, 0.08 wt. percent acetophenone and 0.34 wt. percent of undetermined impurity. The phenol sample was therefore 99.34% pure. About 1.5 grams of ammonia in dilute aqueous solution was added to the phenol and the resulting solution was heated at 70° C. with stirring. Thereafter, the phenol was separated from the ammonia and the impurity products by distillation. Gas-liquid chromatography analysis indicated a product purity of 99.93%. The melting point of the product was 40.89° C.

*Example III*

In the purification of phenol containing carbonyl substances as impurities, the phenol is heated in mixture with about 0.2% ethanol amine, based on the weight of the phenol, at reflux conditions for a period of about 5 minutes. Thereafter, a phenol fraction substantially free of carbonyl impurities is separated from the impurity products by distillation.

*Example IV*

Phenol, prepared by decomposition of cumene hydroperoxide and containing carbonyl compounds as impurities, is mixed with .02% ethylamine, based on the weight of the phenol, in aqueous solution. The solution is thoroughly mixed for about 1 hour at room temperature. Thereafter, the impurity products are extracted from the solution with dilute hydrochloric acid. The phenol is recovered substantially free of carbonyl substances.

*Example V*

In the purification of phenol containing carbonyl impurities, about .02% dimethylamine, based on the weight of the phenol, is prepared in aqueous solution and admixed with the phenol. After about 1 hour of mixing at room temperature, the impurity products are extracted with dilute hydrochloric acid and phenol is recovered substantially free of carbonyl impurities.

*Example VI*

In the purification of phenol containing carbonyl impurities, the phenol is heated in mixture with about 0.2% benzylamine, based on the weight of the phenol, at a temperature of about 70° C. for a period of about 5 minutes. Thereafter, the impurity products are extracted with dilute hydrochloric acid and phenol is recovered substantially free of carbonyl substances.

I claim as my invention:

1. A process for the purification of phenol containing acetone condensation products as impurities therein, which process comprises adding to the phenol from about 0.02% to about 0.2%, based on the weight of the phenol, of a nitrogen compound hereinafter described, reacting said acetone condensation products with said nitrogen compound and thereafter distilling phenol from the resultant reaction products, the aforesaid nitrogen compound being represented by the formula $$R_1-\overset{\overset{H}{|}}{N}-R_2$$

wherein $R_1$ and $R_2$ are selected from the group consisting of hydrogen, alkyl, cycloalkyl, aryl, alkaryl, aralkyl, hydroxyalkyl and polymethylene radicals, said polymethylene radicals together forming a heterocyclic ring in combination with the nitrogen atom to which they are attached.

2. The process of claim 1 further characterized in that the said nitrogen compound is ammonia.
3. The process of claim 1 further characterized in that the said nitrogen compound is an alkylamine.
4. The process of claim 1 further characterized in that the said nitrogen compound is a dialkylamine.
5. The process of claim 1 further characterized in that the said nitrogen compound is an alkanolamine.
6. The process of claim 1 further characterized in that the said nitrogen compound is an aralkylamine.
7. The process of claim 3 further characterized in that the said alkylamine is ethylamine.
8. The process of claim 4 further characterized in that the said dialkylamine is dimethylamine.
9. The process of claim 5 further characterized in that the said alkanolamine is ethanolamine.
10. The process of claim 6 further characterized in that the said aralkylamine is benzylamine.

References Cited

UNITED STATES PATENTS 3,169,101   2/1965   Berthox _____ 203—59

OTHER REFERENCES

Marasco, M.: Ind. Eng. Chem., 18, 701 (1926).

LEON ZITVER, *Primary Examiner.*

D. M. HELFER, H. ROBERTS, *Assistant Examiners.*